US006988217B1

(12) United States Patent
Madrid et al.

(10) Patent No.: US 6,988,217 B1
(45) Date of Patent: Jan. 17, 2006

(54) METHOD AND MECHANISM FOR GENERATING A CLOCK SIGNAL WITH A RELATIVELY LINEAR INCREASE OR DECREASE IN CLOCK FREQUENCY

(75) Inventors: Philip E. Madrid, Round Rock, TX (US); Derrick R. Meyer, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 677 days.

(21) Appl. No.: 10/084,566

(22) Filed: Feb. 27, 2002

(51) Int. Cl.
*G06F 1/04* (2006.01)

(52) U.S. Cl. ...................... 713/500; 713/501; 713/502; 713/601; 327/291; 327/156; 377/78; 377/80

(58) Field of Classification Search ................ 713/500, 713/501, 502, 601; 327/291, 156; 377/78, 377/80
See application file for complete search history.

(56) References Cited

U.S. PATENT DOCUMENTS

| | | | | |
|---|---|---|---|---|
| 3,382,460 A * | 5/1968 | Blitz et al. | 331/178 |
| 3,997,800 A | 12/1976 | Bain | |
| 4,105,979 A * | 8/1978 | Kage | 327/115 |
| 4,186,637 A | 2/1980 | Swain et al. | |
| 4,191,942 A | 3/1980 | Long | |
| 4,284,906 A | 8/1981 | Manfredi | |
| 4,315,166 A | 2/1982 | Hughes | |
| 4,471,310 A * | 9/1984 | Yenisey | 327/115 |
| 4,573,017 A * | 2/1986 | Levine | 327/114 |
| 4,855,622 A | 8/1989 | Johnson | |
| 5,485,129 A * | 1/1996 | Franson et al. | 332/100 |
| 5,517,521 A * | 5/1996 | Strawn | 375/219 |
| 5,600,347 A * | 2/1997 | Thompson et al. | 345/667 |
| 5,825,218 A | 10/1998 | Colli et al. | |
| 5,889,436 A * | 3/1999 | Yeung et al. | 331/2 |
| 5,964,881 A * | 10/1999 | Thor | 713/501 |
| 6,043,692 A | 3/2000 | Linoff | |
| 6,289,067 B1 * | 9/2001 | Nguyen et al. | 375/372 |

(Continued)

FOREIGN PATENT DOCUMENTS

EP 1241788 A1 3/2001

OTHER PUBLICATIONS

Oberman, R.M.M., “Electronic Counters” 1973, The Macmillan Press, pp. 198-201, XP002274108.

(Continued)

*Primary Examiner*—Lynne H. Browne
*Assistant Examiner*—Nitin C. Patel
(74) *Attorney, Agent, or Firm*—Meyertons Hood Kivlin Kowert & Goetzel, P.C.; Rory D. Rankin

(57) ABSTRACT

A method and mechanism for generating a clock signal with a relatively linear increase or decrease in clock frequency. A first clock signal is generated with a first frequency which is then used to generate a second clock signal with a second frequency. The second frequency is generated by dropping selected pulses of the first clock signal. Particular patterns of bits are stored in a storage element. Bits are then selected and conveyed from the storage element at a frequency determined by the first clock signal. The conveyed bits are used to construct the second clock signal. By selecting the particular pattern of bits selected and conveyed, the frequency of the second clock signal may be determined. Further, by changing the patterns of bits within the registers at selected times, the frequency of the second clock signal may be made to change in a relatively linear manner.

22 Claims, 10 Drawing Sheets

U.S. PATENT DOCUMENTS

| | | | | |
|---|---|---|---|---|
| 6,292,062 | B1 * | 9/2001 | Bourk et al. | 331/46 |
| 6,329,861 | B1 * | 12/2001 | Francis | 327/291 |
| 6,518,845 | B2 * | 2/2003 | Nakamichi | 331/16 |
| 6,629,256 | B1 * | 9/2003 | Ilan et al. | 713/501 |
| 6,630,849 | B2 * | 10/2003 | Dellow | 327/115 |
| 6,711,694 | B1 * | 3/2004 | Svensson et al. | 713/500 |

OTHER PUBLICATIONS

International Search Report, Application No. PCT/US 02/41658, mailed May 14, 2004.

* cited by examiner

300

| Reference Frequency (MHz) 301 | Divisor 302 | Frequency (MHz) 303 | Dropped Pulses (out of 8) 304 | Effective Divisor 305 | Effective Frequency (MHz) 306 |
|---|---|---|---|---|---|
| 1000 | 1 | 1000 | 0 | 1 | 1000 |
| 1000 | 1 | 1000 | 1 | 1.14 | 875 |
| 1000 | 1 | 1000 | 2 | 1.33 | 750 |
| 1000 | 1 | 1000 | 3 | 1.6 | 675 |
| 1000 | 2 | 500 | 0 | 2 | 500 |
| 1000 | 2 | 500 | 2 | 2.67 | 375 |
| 1000 | 4 | 250 | 0 | 4 | 250 |
| 1000 | 8 | 125 | 0 | 8 | 125 |

*Fig. 3*

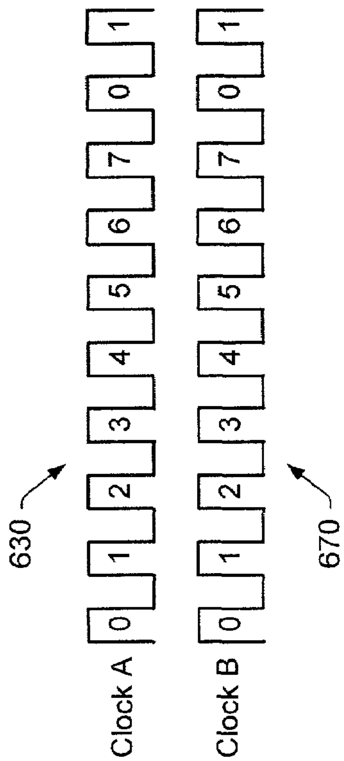
Fig. 6A
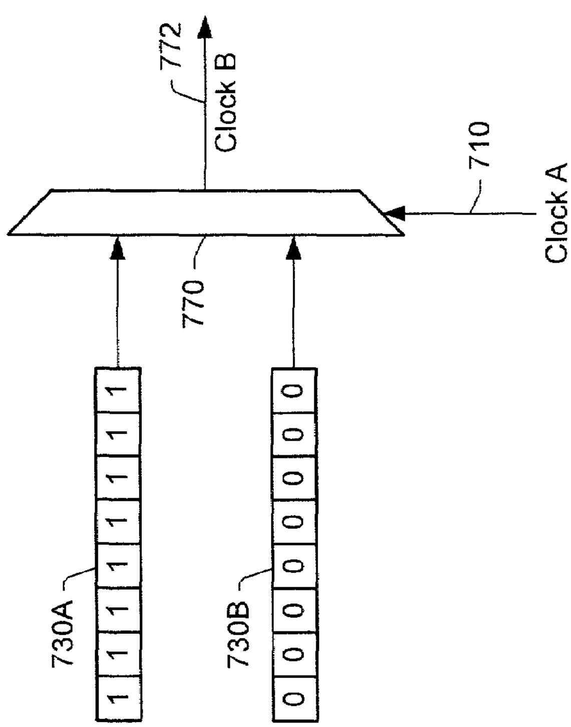

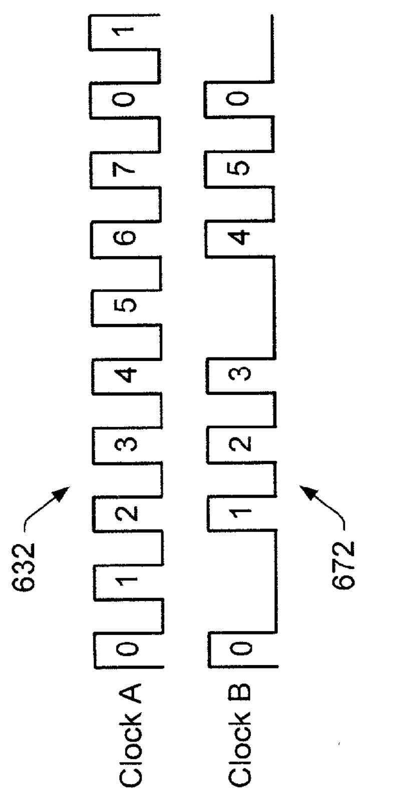
Fig. 6B
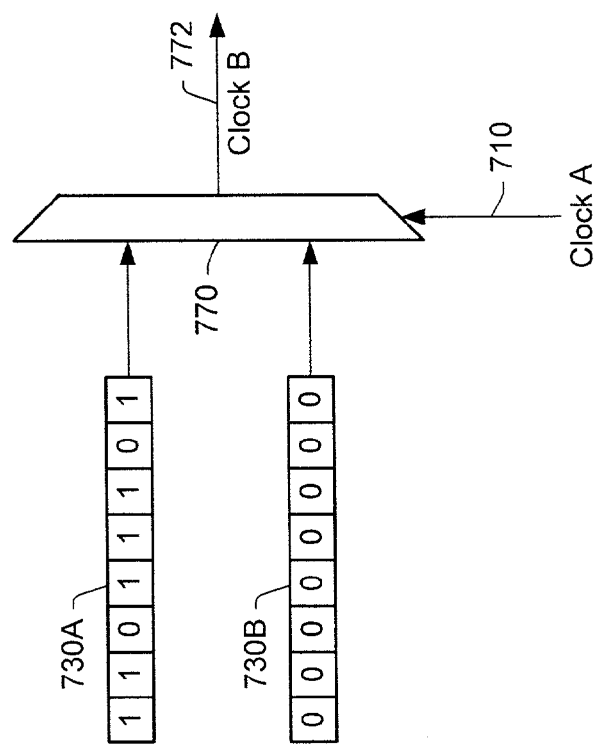

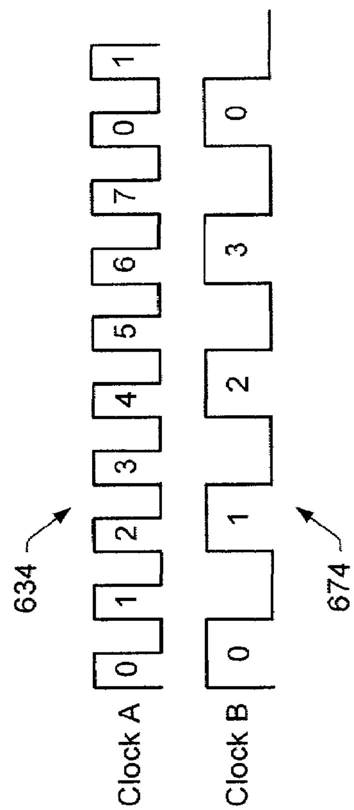
Fig. 6C
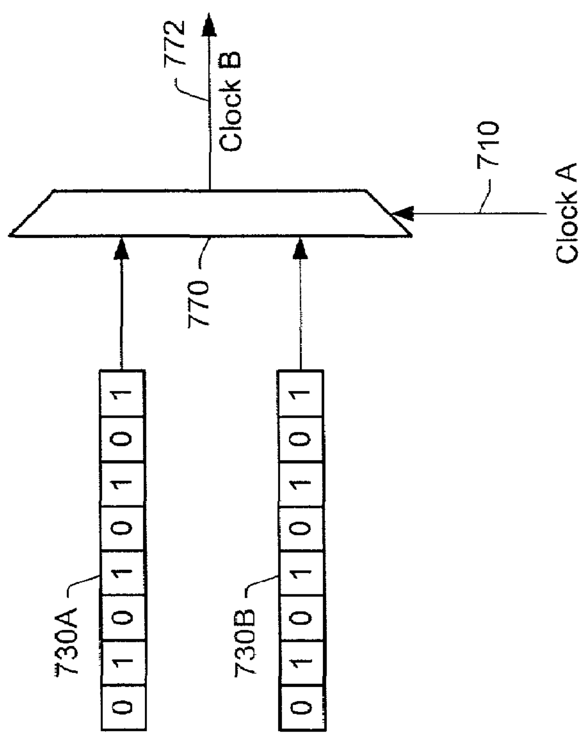

METHOD AND MECHANISM FOR GENERATING A CLOCK SIGNAL WITH A RELATIVELY LINEAR INCREASE OR DECREASE IN CLOCK FREQUENCY

BACKGROUND OF THE INVENTION

1. Field of the Invention

This invention relates to computer system power management and, more particularly, to controlled entry and exit of low power states.

2. Description of the Related Art

As computer systems have become more powerful, power management has become a more critical part of the overall system design. This may be especially true for systems that have portable applications. To reduce the power consumed by a computer system, many computer systems employ processors that are capable of entering a standby or low power mode when there is no demand on the processor for a specified duration. In addition, to further decrease the power consumed by a system, the same low power modes may be implemented for the chipsets that are associated with the processor.

There are many ways to place a system component into a low power mode. For integrated circuits using complementary metal oxide semiconductor (CMOS) technology, the time during a transition from a logic one to a logic zero and from a logic zero to a logic one typically consumes the most power since the most current is flowing in a particular circuit. Thus, one method of decreasing system power is to reduce or halt unnecessary switching.

One power management technique involves entering a low power state by lowering the internal clock frequency when the processor is idle. When the processor is no longer idle it returns the internal clock frequency back to full frequency. However, return to full frequency should be accomplished relatively quickly so that the overall cost in time of entering the low power state does not outweigh the benefit of low power states. Therefore, it is desired to lower the clock frequency in such a way that the PLL VCO (voltage controlled oscillator) frequency is maintained (i.e. the PLL should not lose frequency lock). Maintaining the VCO frequency allows the PLL to recover from low power states faster than if it had lost frequency lock.

Since the VCO frequency is maintained while in a low power state, the internal clock frequency may by reduced by dividing the VCO clock. One method for accomplishing this is by clocking a counter with the VCO. The least significant bit (LSB) of the counter is VCO/2, which may, for example, be used as the full frequency of the internal clock. The next LSB of the counter then produces a VCO/4 clock. Selecting other bits of the counter reduces the frequency the device runs at by a factor of 4, 8, 16, 32, etc.

While the technique described above allows for rapid selection of the full frequency, it is not without its drawbacks. The power consumed by the device is proportional to the frequency. A reasonably accurate estimation of power consumption for CMOS technologies may be expressed as Power=Capacitance*Volt$^2$*frequency. However, as described above, the method employed to reduce the frequency while maintaining frequency lock involves reducing the internal frequency by powers of 2. Consequently, ramping down the clock from full frequency to half the full frequency implies a 50% drop in power instantaneously. This sudden drop may cause the voltage on the device to jump before the voltage regulator can adjust to the reduced current demand. The situation is similar when ramping the clock back to full frequency. There is suddenly a demand for more current because the frequency has suddenly doubled. In this case, the voltage on the part may drop below the intended voltage and perhaps out of specification.

In addition to the power management techniques described above, other scenarios exist in which a sudden increase in frequency is required. For example, upon reset an internal clock may be maintained at a relatively low frequency until a local PLL achieves a lock. Subsequent to the PLL attaining lock, a rapid increase in operating frequency may be required. A similar situation may exist upon startup as well.

The unintended overshoot or undershoot of the voltage described above is potentially destructive to state stored in storage elements on the chip or may reduce the life of the chip. What is desired is a method for increasing or decreasing the frequency in an efficient manner.

SUMMARY OF THE INVENTION

Various embodiments of a circuit and method for increasing and decreasing operating frequency in an efficient manner are disclosed.

Generally speaking, a method and mechanism are contemplated wherein a first clock signal is generated with a first frequency which is then used to generate a second clock signal with a second frequency. The second frequency is generated by dropping selected pulses of the first clock signal. In one embodiment, a storage element is used to store patterns of bits which are then conveyed at a frequency determined by the first clock signal in order generate the second clock signal. The particular pattern of bits conveyed then determine the frequency of the second clock signal. In an alternative embodiment, sequences of pulses of the first clock signal are counted. When particular pulses of each sequence are detected, the detected pulses are dropped or otherwise masked to generate the second clock signal. In addition to the above, the method and mechanism contemplates changing the number of pulses which are dropped over a period of time in order to generate relatively linear increases or decreases in frequency of the second clock signal.

BRIEF DESCRIPTION OF THE DRAWINGS

FIG. 3 is a table illustrating a relationship between frequency and masked pulses.

FIG. 6A illustrates signals generated according to the embodiment described in FIG. 5.

FIG. 6B illustrates signals generated according to the embodiment described in FIG. 5.

FIG. 6C illustrates signals generated according to the embodiment described in FIG. 5.

Figure 1:
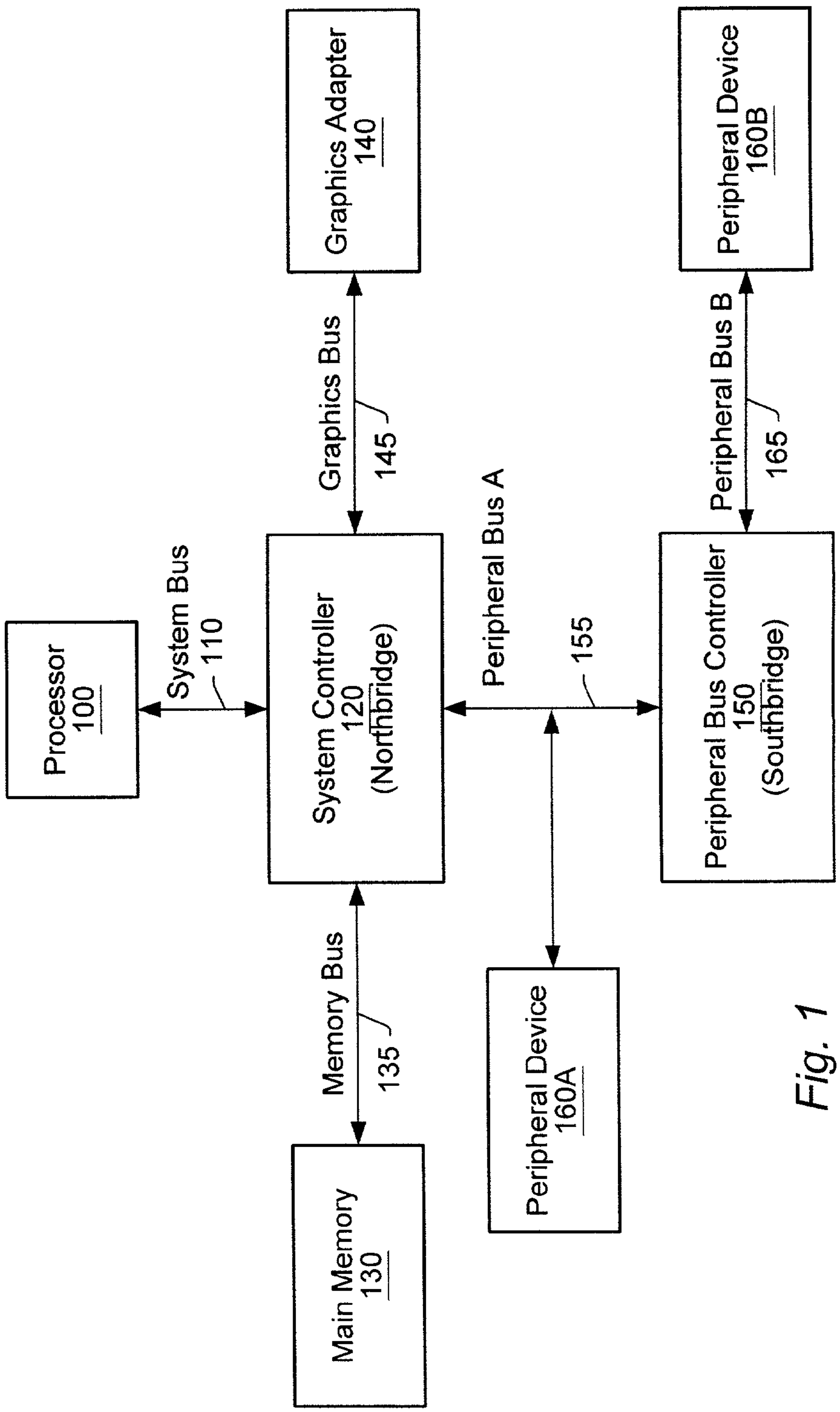
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system is shown. The computer system includes a processor 100 coupled to a system controller 120 through a system bus 110. System controller 120 is coupled to main memory 130 through a memory bus 135. System controller 120 is also coupled to a graphics adapter 140 through a graphics bus 145. A peripheral controller 150 is coupled to system controller 120 through a peripheral bus A 155. Various peripheral devices such as 160A and 160B may be connected to peripheral bus A 155 and peripheral bus B 165, respectively. In one embodiment, system controller 120 may be a Northbridge style integrated circuit which may be part of a chip set used in conjunction with processor 100. Alternatively, system controller 120 may be integrated with processor 100. In such an integrated embodiment, memory 130 may be coupled directly to the processor 100. In the illustrated embodiment, processor 100 is an example of an x86 class processor. However, in other embodiments, processor 100 may be any type of processor. Numerous alternative configurations are possible and are contemplated.

During operation, processor 100 may have periods of idle time during which the system clock may continue to run but processor 100 is not processing data. As described above, logic transitions in a clocked system component may be a major source of power consumption in an integrated circuit. Thus, stopping or reducing the frequency of the clock signal during idle periods is one method of saving power. In addition to processor 100, additional system power savings may be realized by stopping the internal clock of the chipsets and other peripheral components associated with processor 100.

As will be described in greater detail below, when idle periods are detected in the computer system, a signal may be activated which may alert processor 100 to stop or reduce its internal clock, thereby achieving additional system power savings.

Figure 2:
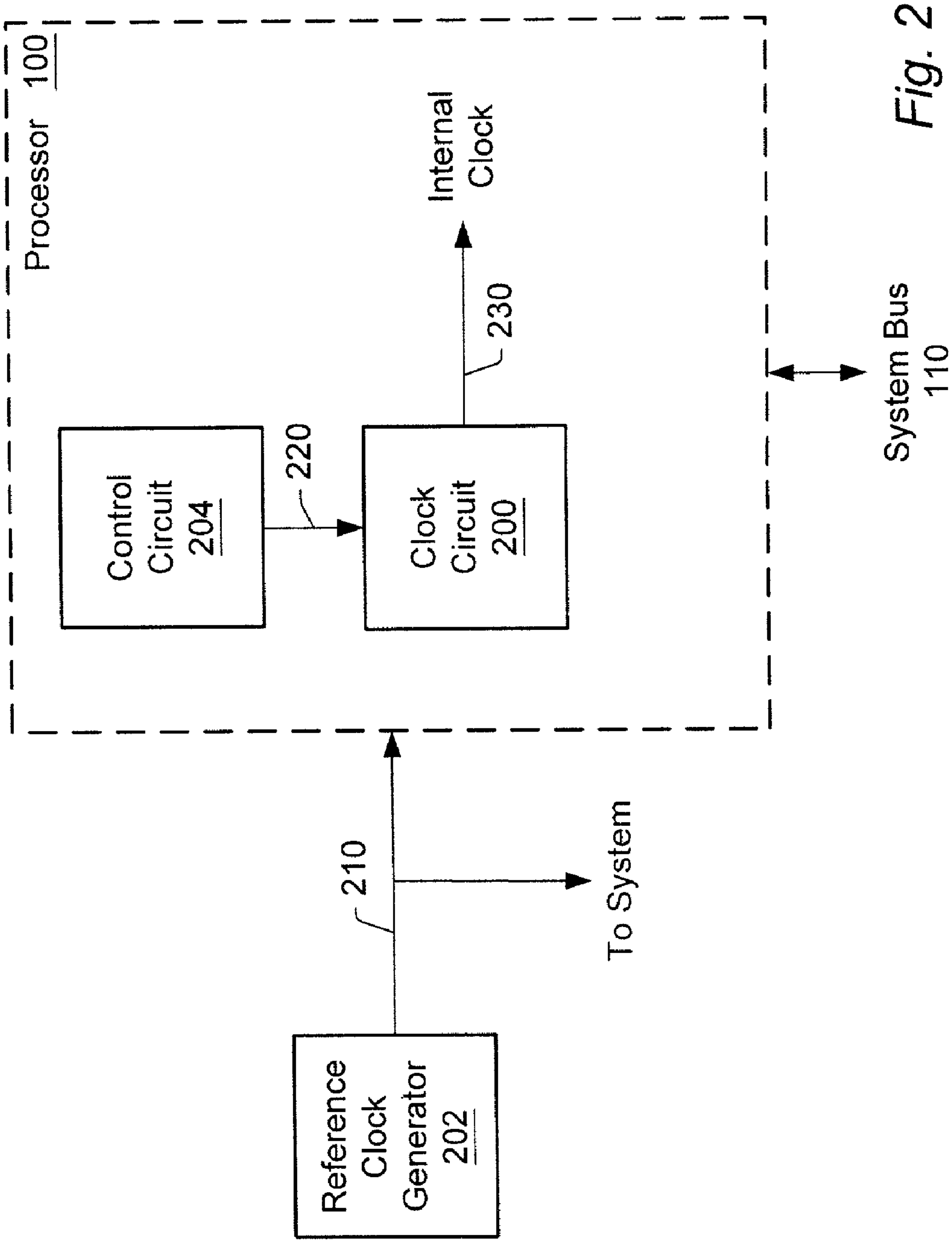
FIG. 2 is a block diagram of one embodiment of a processor and clock generator.

Referring to FIG. 2, a block diagram of one embodiment of a processor 100 coupled to a reference clock generator circuit 202 are shown. Circuit components that correspond to those shown in FIG. 1 are numbered identically for simplicity and clarity. Processor 100 includes a clock circuit 200 coupled to a control circuit 204. Processor 100 is also coupled to receive reference clock signal 210 from clock generator 202. Clock circuit 200 is coupled to receive signal(s) 220 from control circuit 204 and is further configured to convey internal clock signal 230. Processor 100 is also shown coupled to system bus 110.

In the illustrated embodiment, clock generator circuit 202 and clock circuit 200 may include a locked loop circuit such as a phase locked loop or a delay locked loop. Clock circuit 200 receives external reference clock 210 and generates a varying PLL clock corresponding to the reference clock 210. Clock circuit 200 may adjust the phase and frequency to lock a feedback clock signal to the phase and the frequency of external reference clock 210. As discussed above, processor 100 may be configured to reduce or stop its internal clock in order to achieve power savings. Clock circuit 200 may include a counter from which different clock frequencies in powers of two may be derived. However, in order to achieve more linear transitions in clock frequencies, clock circuit 200 is further configured to derive further clock frequencies.

Turning now to FIG. 3, a table 300 is shown illustrating one embodiment of the operation of clock circuit 200. Table 300 includes six columns 301–306. Column 301 show a reference frequency of a clock signal received by circuit 200. In the embodiment shown, reference frequency 301 may represent the maximum operating frequency of the processor's internal clock signal. In alternative embodiments, the maximum frequency of the processor's internal clock signal may not be equal to reference frequency 301. Column 302 shows a divisor applied to the reference frequency 301, and column 303 shows the result of dividing the reference frequency 301 by the corresponding divisor 302. In one embodiment the reference frequency is applied to a counter and the divisor is achieved by taking selected bits of the counter (i.e., the least significant bit of the counter corresponds to a divisor of two, the next least significant bit corresponds to a divisor of four, and so on.).

As already discussed, deriving clock frequencies from a counter in this manner results in frequencies which are powers of two. As illustrated in the embodiment of table 300, given a reference frequency of 1000 MHz, four frequencies 303 may be achieved: 1000 MHz, 500 MHz, 250 MHz, and 125 MHz. In order to achieve a more efficient and linear transition of frequencies, column 304 illustrates a method and mechanism whereby certain pulses of the frequency 303 are dropped or masked. In the embodiment shown, circuit 200 is configured to drop N of M pulses of the clock signal 303, where M equals 8 and N is an integer from 0–M. In other embodiments, M may be an integer larger or smaller than 8. In this manner, additional effective divisors 305 may be achieved and further effective clock frequencies 306 may be derived from frequency 303.

For example, given a frequency 303 of 1000 MHz and dropped pulses 304 of 0, 1, 2, and 3, effective divisors of 1, 1.14, 1.33, and 1.6 may be achieved, respectively. Consequently, four effective frequencies, 1000 MHz, 875 MHz, 750 MHz, and 675 MHz, may be derived from the single frequency 303 of 1000 MHz. In a similar manner, the frequencies 500 MHz and 375 MHz may be derived from the frequency 303 of 500 MHz. Further, as may be seen from the embodiment shown in FIG. 3, not only are additional frequencies derivable, but the resulting effective frequencies 306 transition in 125 MHz increments, resulting in a more linear transition between frequencies.

While the example of FIG. 3 utilizes particular frequencies 301, divisors 302, and dropped pulses 304, they are intended to be exemplary only. Those skilled in the art will recognize different combinations of reference frequencies 301, divisors 302 and dropped pulses 304 may be utilized to achieve any number of effective frequencies 306.

Figure 4A:
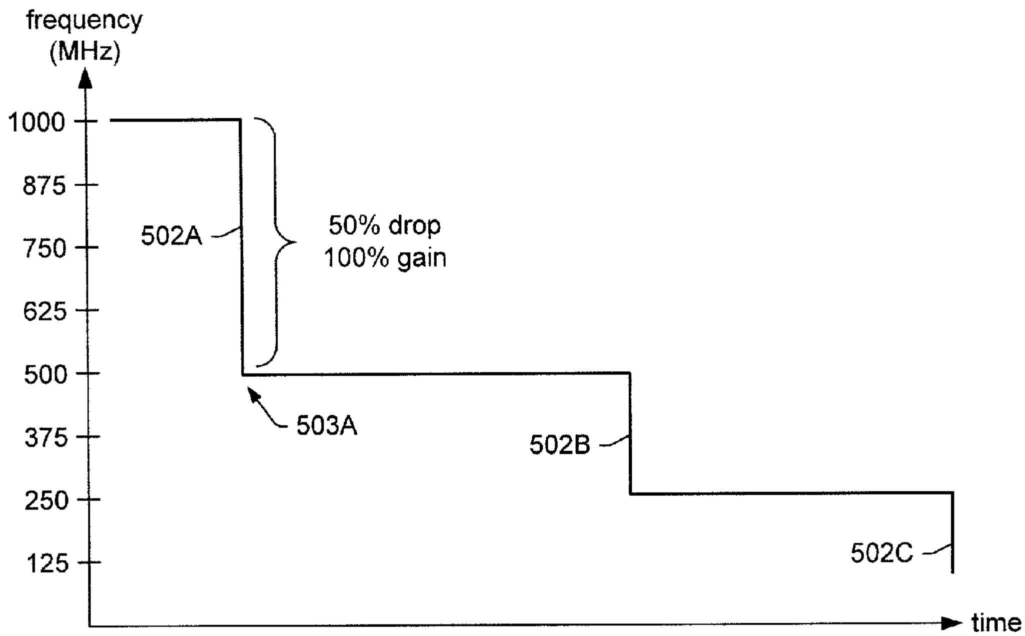
FIG. 4A is a chart showing frequency transitions as powers of two.
Figure 4B:
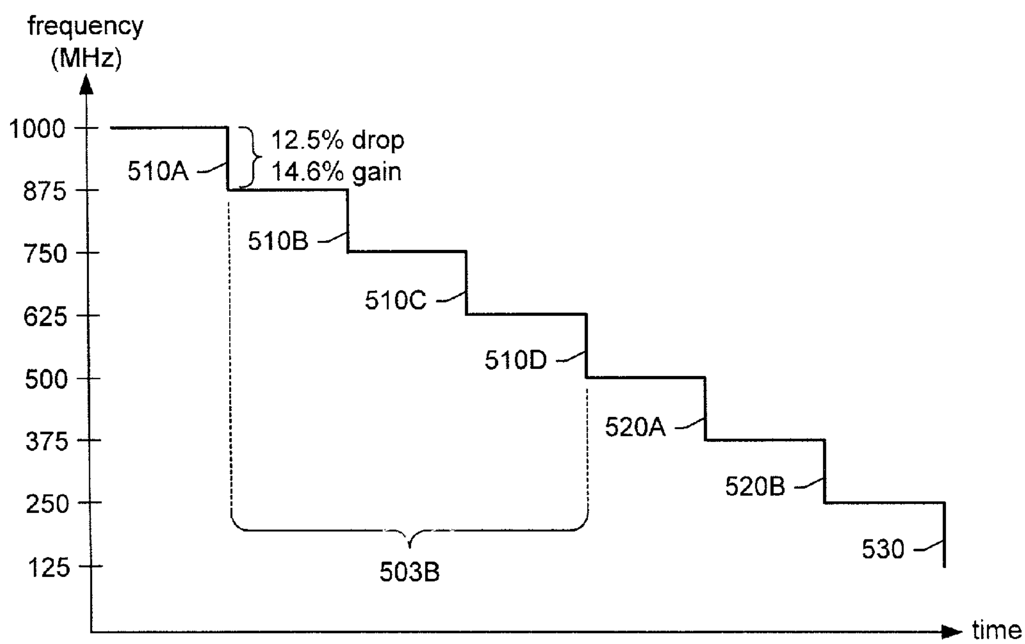
FIG. 4B is a chart showing one embodiment of frequency transitions using the method and mechanism described herein.

Turning now to FIG. 4A and FIG. 4B, graphic depictions are provided to illustrate the effect of the dropped pulses shown in FIG. 3. FIG. 4A shows a graph with a y-axis representing frequency and x-axis representing time. FIG. 4A illustrates transitions between clock frequencies as powers of two. Such transitions may be achieved by utilizing a counter as described above. At a first point in time 502A, a transition from 1000 MHz to 500 MHz occurs (assuming a decrease in frequency is initiated). Subsequently, a transition 502B from 500 MHz to 250 MHz, and finally a transition 502C from 250 MHz to 125 MHz occurs. As can be seen, the transition 502A from 1000 MHz to 500 MHz is abrupt and manifestly non-linear. When decreasing frequency from 1000 MHz to 500 MHz, a 50% drop in power results. Conversely, when increasing frequency from 500 MHz to 1000 MHz, a 100% increase in power results. Such power fluctuations are relatively dramatic.

FIG. 4B illustrates the effect of utilizing the dropped pulse method described above in FIG. 3. FIG. 4B also shows a graph as in FIG. 4A wherein a frequency transition from 1000 MHz to 125 MHz occurs. However, in this case, numerous intermediate steps are in the transitions. For example, the transition from 1000 MHz to 500 MHz occurs in four steps, 510A–510D. The transition from 500 MHz to 250 MHz occurs in two steps, 520A and 520B. In contrast to the abrupt transition 503A of FIG. 4A, the transition 510A–510D from 1000 MHz to 500 MHz shown in FIG. 4B is not so abrupt, but is much more linear. In this case, the transition 510A from 1000 MHz to 875 MHz results in a relatively small 12.5% drop in power. Conversely, increasing frequency from 875 MHz to 1000 MHz involves an increase in power of 14.6%. In this manner, fluctuations in power may be reduced significantly.

Figure 5:
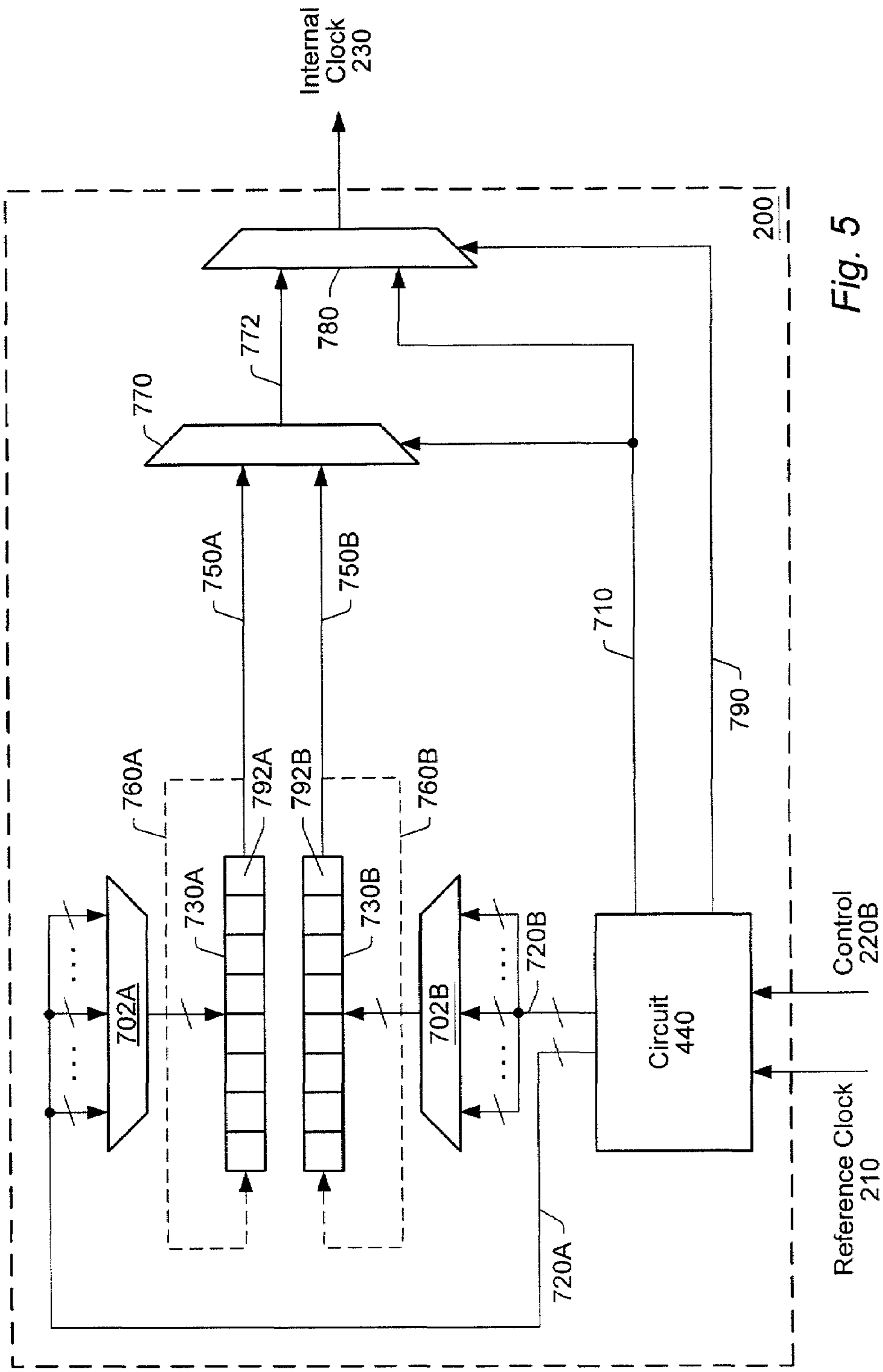
FIG. 5 is a diagram illustrating one embodiment of a clock circuit.

Turning now to FIG. 5, one embodiment of clock circuit 200 is shown. In the embodiment of FIG. 5, circuit 200 includes circuit 440, multiplexors 702, 770 and 780, and registers 730. Each of registers 730 are coupled to multiplexor 770 which is configured to convey signal 772 to multiplexor 780. Circuit 440 is coupled to receive a reference clock 210 and control signal(s) 220B. Circuit 440 is further coupled to convey data via paths 720 to multiplexors 702. Circuit 440 is also configured to generate a clock signal 710, which in one embodiment is output from a VCO, which is then coupled as a select control signal 710 to multiplexor 770 and input to multiplexor 780. Finally, circuit 440 is configured to convey multiplexor select signal 790 to multiplexor 780 which conveys internal clock signal 230. Elements referred to herein with a particular reference number followed by a letter will be collectively referred to by the reference number alone. For example, registers 730A and 730B may be collectively referred to as registers 730.

In the exemplary embodiment shown, each of registers 730 is configured to store eight bits of data, though any suitable size for registers 730 may be chosen. Further, while the embodiment shown utilizes two registers 730A–730B, other embodiments may utilize fewer or more registers. In one embodiment, clock signal 710 may be a fixed frequency based on the received reference clock signal 210. Alternatively, circuit 440 may be configured to generate clock signal 710 at a variety of frequencies. For example, clock signal 710 may be a multiple (greater than or less than one) of reference clock 210. Generally speaking, the internal clock signal 230 conveyed by circuit 200 is equal to one of the two signals, 772 or 710, received by multiplexor 780. Control signal 790 is used to select which of the two signal will be conveyed as the internal clock signal 230.

If signal 710 is selected for conveyance from multiplexor 780, then the internal clock signal 230 will be substantially equal to the clock signal 710 generated by circuit 440. On the other hand, if signal 772 is selected for conveyance from multiplexor 780, internal clock 230 may have a frequency which is other than that of clock signal 710.

As shown in FIG. 5, each of registers 730 are coupled to multiplexor 770. In one embodiment, registers 730 are configured as shift registers which are configured to shift their contents subsequent to conveying a value. Additionally, registers 730 may optionally be configured as a circular shift register wherein values which are shifted out are shifted back in to registers 730 via paths 760. As mentioned above, circuit 440 is configured to convey data via paths 720 for loading into registers 730. In one embodiment, multiplexors 702 may be configured to select from a number of eight bit values conveyed via path 720 for simultaneous loading into registers 730. Circuit 440 may be configured to control which values are selected for conveyance from multiplexors 702. For example, in one embodiment, each of paths may be configured to convey 32 bits of data. In this manner, four possible 8 bit load values may be conveyed to multiplexors 702 simultaneously. Values in a first position 792A and 792B or registers 730 are then conveyed via paths 750 to multiplexor 770. As clock signal 710 is used as a select signal to multiplexor 770, values 792A and 792B will be alternately conveyed as signal 772. In the following discussion, a few examples are given to illustrate how the register 730 values may be used to generate a variety of clock frequencies.

FIG. 6A illustrates one example of how circuit 200 may be used to generate a variety of clock frequencies. FIG. 6A shows registers 730, multiplexor 770, clock signal 772 (labeled "Clock B") and selector 710 (labeled "Clock A"). Also illustrated are signals 630 and 670 representative of the values of Clock A and Clock B, respectively. Clock signals 630 and 670 are also marked with values from 0–7 indicating relative clock cycles. In the example of FIG. 6A, register 730A is loaded with all "1"s and register 730B is loaded with all "0"s. By loading the registers 730 in this manner, Clock B 772 assumes a frequency substantially equal to Clock A 710.

FIG. 6B illustrates a loading of registers 730 which results in different frequencies between Clock A 710 and Clock B 770. In this example, a similar register 730 loading to that of FIG. 6A is used, except that two bits of register 730A have been changed from "1" to "0". As Clock A 770 alternately gates out the values of registers 730A and 730B, Clock B 230 assumes a different form than that of FIG. 6A. In this case, the values gated out of multiplexor 770 as Clock B are "1", "0", "0", "0", "1", "0", "1", "0", "1", "0", "0", "0", "1", "0", "1", "0". If registers 730 are configured in a circular manner, this pattern will repeat until the register load values are changed. The relationship between Clock A 710 and Clock B 772 is graphically depicted as signals 632 and 672, respectively. Given that eight bits are used for each register 730 in this example, we see that Clock B 772 has six clock cycles to every eight clock cycles of Clock A 710. Therefore, utilizing these particular register 730 load values, two out of every eight clock cycles of Clock A 710 are effectively masked. Viewed in another way, Clock B 772 has a frequency which is 75% that of Clock A 710. If Clock A 710 were 1000 MHz, Clock B 772 would then be 750 MHz.

FIG. 6C shows an additional example using different register 730 load values. In this example, each of registers 730A and 730B are loaded with an identical, alternating sequence of bits. As illustrated by the corresponding signal depictions 634 and 674, Clock B 772 assumes a frequency which is half that of Clock A 710. By using the above described method and mechanism, one or more pulses of Clock A 710 may be effectively dropped to create a Clock B 772 of a different frequency. Those skilled in the art will readily determine that a wide variety of clock frequencies for Clock B 772 may be generated by an appropriate selection of predetermined values placed in registers 730. Further, registers with more than eight entries may be used to create a wider variety of frequencies. By changing the contents of registers 730 at selected times, more linear increases and decreases of internal frequencies may be achieved.

Figure 7:
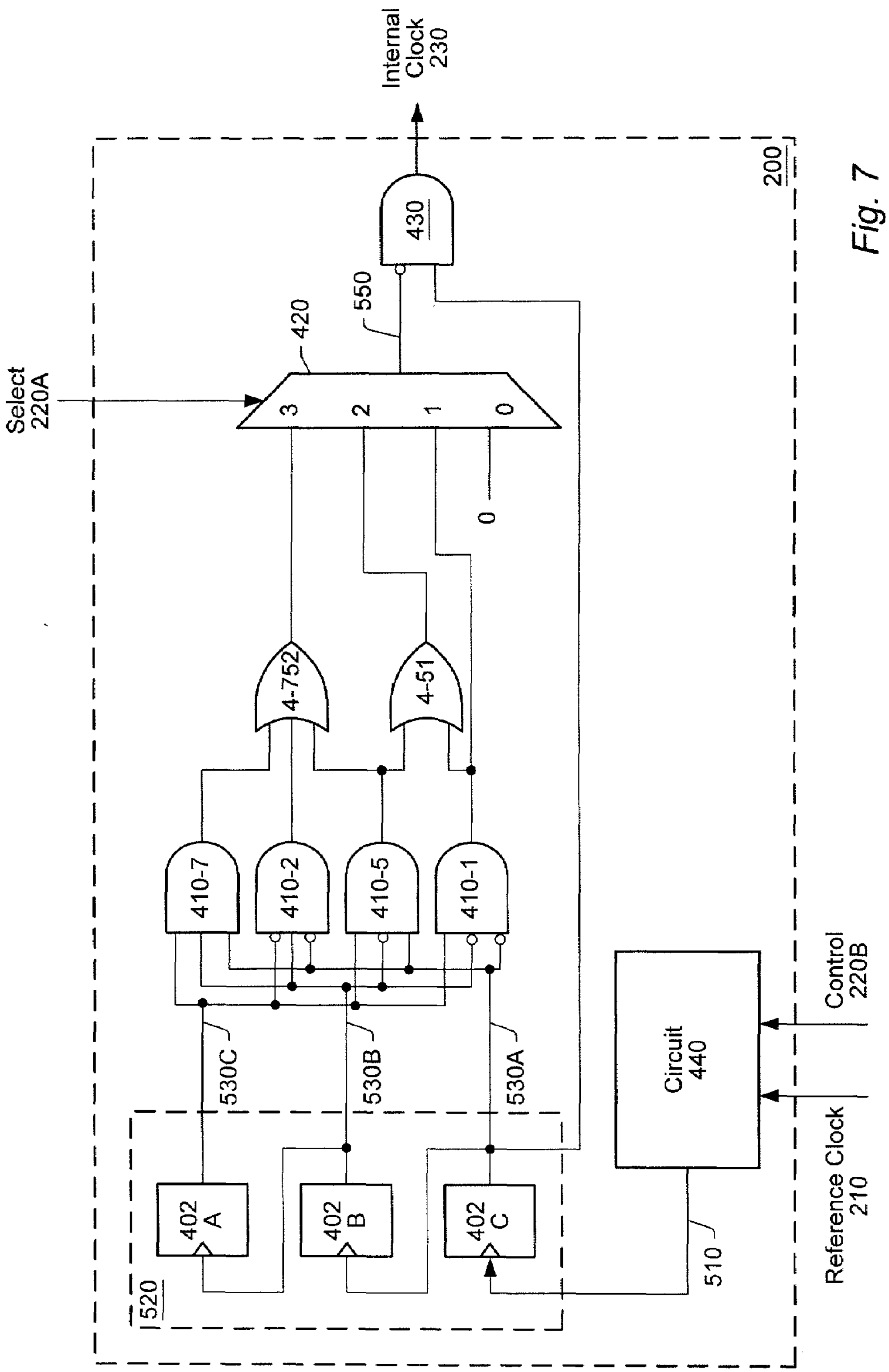
FIG. 7 is a diagram illustrating one embodiment of a clock circuit.

FIG. 7 shows an alternative embodiment of clock circuit 200. Generally speaking, clock circuit 200 may be configured to receive a clock signal, count an integer number M of those clock signals, and drop or mask an integer number N out of those M clock pulses. In the exemplary embodiment of FIG. 7, clock circuit 200 is coupled to receive a reference clock signal 210 and control signals 220A–220B. Circuit 200 includes a control circuit 440, counter 520 comprising three storage elements 402A–402C, and multiplexor 420. Circuitry 440 is configured to receive a reference clock signal 210 and generate clock signal 510. In one embodiment, circuit 440 may include a counter or other circuitry configured to derive frequencies for clock signal 510 from the reference frequency 210 in powers of two. In one embodiment, the maximum frequency of clock signal 510 is half the frequency of reference clock 210, though other configurations are possible and are contemplated.

In the embodiment of FIG. 7, counter 520 is configured to count pulses of clock signal 510 in groups of eight from 0–7. Signal 530A represents the least significant bit of counter 520, signal 530B the next least significant bit, and signal 530C represents the most significant bit. Output signals from counter 520 are coupled to gates 410-N (where N is 1, 2, 5 and 7) and multiplexor 420. Gate 410-7 is configured to detect when a count of 7 is output from counter 520, gate 410-2 detects a count of 2, gate 410-5 detects a count of 5, and gate 410-1 detects a count of 1. OR gate 4-752 is configured to detect the assertion of three out of eight pulses. In the embodiment shown, gate 4-752 detects when any of counts 7, 5, or 2 are asserted. OR gate 4-51 detects two out of eight pulses by detecting when counts 5 or 1 are asserted. Finally, output from each of gates 4-752, 4-51, 410-1, and counter signal 530A are coupled to multiplexor 420. Multiplexor 420 output 550 is coupled to AND gate 430 via inverted input. In addition, counter 520 output 530A is coupled to AND gate 430.

As configured in FIG. 7, multiplexor 420 includes four inputs, each corresponding to a number of clock pulses to be masked from the internal clock signal 230 which is conveyed by gate 430. In the embodiment shown, the multiplexor 420 input corresponding to a selection of 0 is tied low. Generally speaking, when the multiplexor 420 input corresponding to 0 is gated out, internal clock 230 will equal clock signal 530A. When the multiplexor 420 input corresponding to a selection of 1 is selected, the output 550 will be asserted once every eight clock 530A pulses. Because the signal 550 is coupled to gate 430 via inverted input, the output from gate 430 will be masked off once every eight clock pulses. Similarly, when the output from gate 4-51 is gate out the multiplexor 420, gate 430 output 230 will be masked twice every eight clock pulses. Finally, gate 430 output 230 will be masked three times each eight clock pulses when gate 4-752 is gated out the multiplexor 420. In this manner, the output from the multiplexor 420 may be used to control how many clock pulses are dropped or masked from the resulting clock signal 230.

In the embodiment of FIG. 7, control signals 220A and 220B may be conveyed from processor 100 in response to detecting a change in power state is indicated. For example, in response to detecting a period of idle time, processor 100 convey signals 220A–220B to cause a reduction in the internal clock 230 frequency. Alternatively, while in a reduced power state, processor 100 may detect an interrupt or other signal indicating an increased power state is required. By coordinating the frequency of clock signal 510 with signal 220B, and the number of pulses to be dropped with signal 220A, processor 100 may achieve more linear transitions in operating frequencies.

Figure 8:
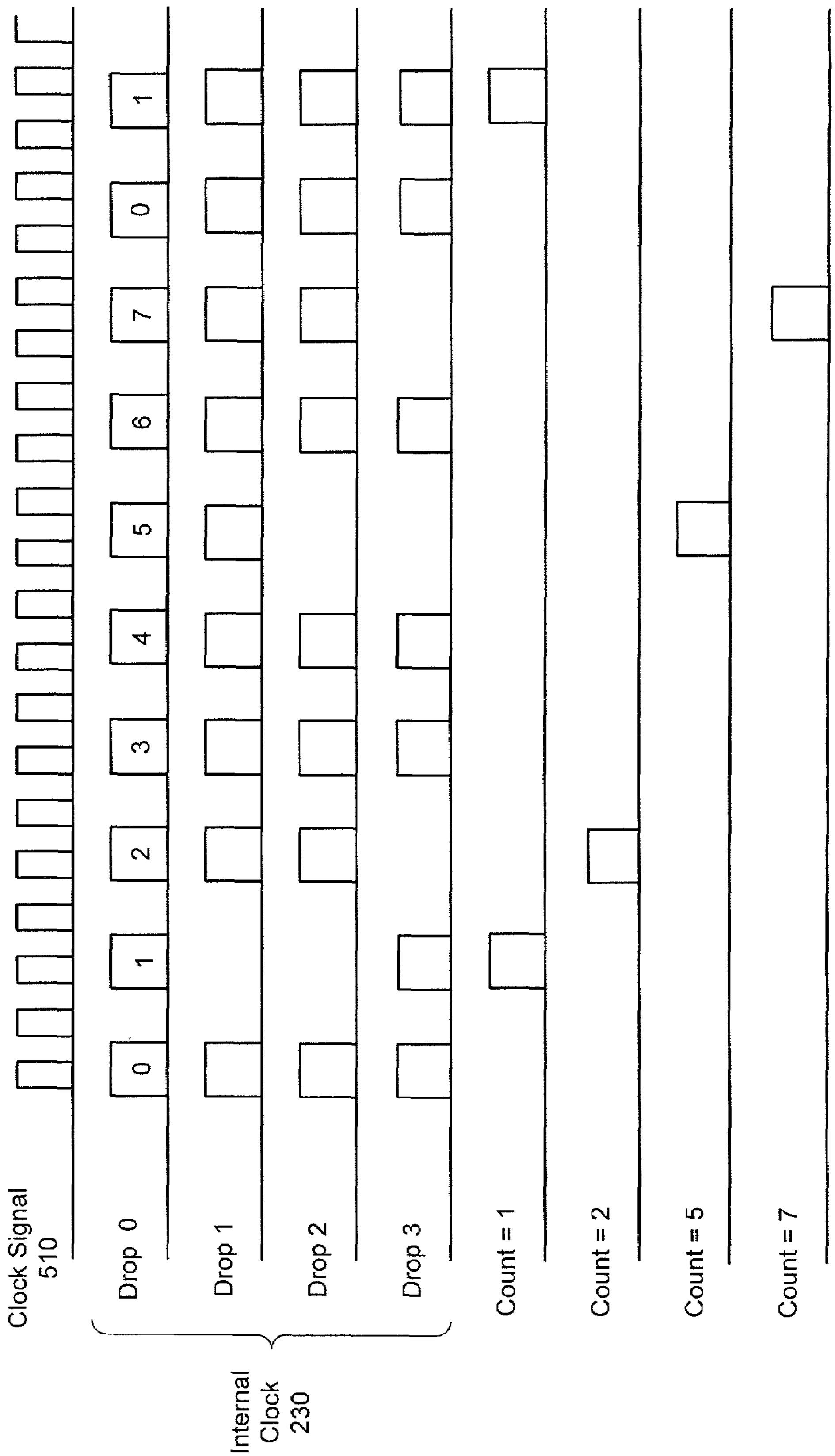
FIG. 8 is a diagram illustrating one embodiment of signals generated according to the embodiment described in FIG. 7.

Finally, FIG. 8 depicts a number of signals corresponding the embodiment of FIG. 7. Clock signal 510 is shown as operating at twice the frequency of clock signal 530A. The internal clock signal 230 is shown when 0, 1, 2, and 3 pulses are dropped or masked. Also shown are signals which are asserted when a given count of counter 520 occurs. Signals corresponding to counts of 1, 2, 5, and 7, which correspond to gates 410-1, 410-2, 410-5 and 410-7, respectively, are depicted in the example. While the counts of 1, 2, 5 and 7 have been described above, they are intended to be exemplary only. In addition, while the counter 520 shown in FIG. 7 is configured to count pulses in groups of eight, counters of other sizes may be used as well. For example, counter 520 may be configured to count groups of sixteen pulses and the remaining circuitry of circuit 200 may be configured to detect one or more of those pulses.

Numerous variations and modifications will become apparent to those skilled in the art once the above disclosure is fully appreciated. For example, while particular embodiments have been used for discussion purposes, other embodiments are possible and are contemplated. Different applications of the linear frequency transitioning described herein may include more intermediate steps between frequency transitions, power saving modes which turn off the internal clock completely, and so on. Also, while much of the discussion has focused on transitions from higher to lower frequencies, the method and mechanism is equally applicable to the reverse. It is intended that the following claims be interpreted to embrace all such variations and modifications.

The invention claimed is:

1. A method for generating a plurality of clock frequencies over a period of time in a linear manner, said method comprising:

generating a first clock signal with a first frequency; and counting sequences of pulses of said first clock signal, wherein said sequences include a fixed number of pulses;

utilizing said first clock signal to generate a second clock signal;

wherein said second clock signal is generated with a plurality of clock frequencies, said plurality of clock frequencies including a beginning clock frequency, one or more intermediate clock frequencies, and an ending clock frequency; and wherein a transition from said beginning clock frequency, through said intermediate clock frequencies, to said ending clock frequency is performed in a linear manner by dropping selected pulses of said first clock signal; and detecting said selected pulses of said first clock signal, wherein said selected pulses correspond to particular counts of said pulses within said fixed number of pulses.

2. The method of claim 1, wherein utilizing said first clock signal comprises using said first clock signal to select a sequence of values from a storage element.

3. The method of claim 2, wherein said storage element comprises a first and second shift register, and wherein said sequence of values are alternately selected from said registers.

4. The method of claim 1, wherein performing said transition comprises either dropping a successively greater number of pulses or dropping a successively fewer number of pulses.

5. The method of claim 3, further comprising loading said shift registers with predetermined values.

6. The method of claim 5, further comprising changing a contents of said shift registers at selected times in order to generate said second clock signal with an increasing frequency.

7. The method of claim 5, further comprising changing a contents of said shift registers at selected times in order to generate said second clock signal with an decreasing frequency.

8. A clock circuit for generating a plurality of clock frequencies over a period of time in a linear manner, the clock circuit comprising:

a first circuit configured to generate a first clock signal;

a counter configured to count sequences of pulses of said first clock signal, wherein said sequences include a fixed number of pulses; and circuitry configured to utilize said first clock signal to generate a second clock signal;

wherein said second clock signal is generated with a plurality of clock frequencies, said plurality of clock frequencies including a beginning clock frequency, one or more intermediate clock frequencies, and an ending clock frequency;

wherein a transition from said beginning clock frequency, through said intermediate clock frequencies, to said ending clock frequency is performed in a linear manner by dropping selected pulses of said first clock signal; and wherein said circuitry is configured to detect said selected pulses of said first clock signal, wherein said selected pulses correspond to particular counts of said pulses within said fixed number of pulses.

9. The clock circuit of claim 8, further comprising a storage element configured to store a pattern of bits, wherein said circuitry is configured to utilize said first clock signal to select a sequence of values from a storage element.

10. The clock circuit of claim 9, wherein said storage element comprises a first and second shift register, and wherein said circuitry is configured to select said sequence of values from said registers in an alternating manner.

11. The clock circuit of claim 10, wherein said first circuit is further configured to load said shift registers with predetermined values.

12. The clock circuit of claim 11, wherein said first circuit is further configured to change a contents of said shift registers at selected times in order to generate said second clock signal with an increasing frequency.

13. The clock circuit of claim 11, wherein said first circuit is further configured to change a contents of said shift registers at selected times in order to generate said second clock signal with a decreasing frequency.

14. The clock circuit of claim 8, wherein said clock circuit is included within a processor.

15. A system comprising:

a reference clock generator configured to generate a reference clock signal; and a processor comprising a clock circuit configured to:

receive said reference clock signal;

count sequences of pulses of said first clock signal, wherein said sequences include a fixed number of pulses;

generate a first clock signal from said reference clock signal; and utilize said first clock signal to generate a second clock signal;

wherein said second clock signal is generated with a plurality of clock frequencies, said plurality of clock frequencies including a beginning clock frequency, one or more intermediate clock frequencies, and an ending clock frequency; and wherein a transition from said beginning clock frequency, through said intermediate clock frequencies, to said ending clock frequency is performed in a linear manner by dropping selected pulses of said first clock signal; and detect said selected pulses of said first clock signal, wherein said selected pulses correspond to particular counts of said pulses within said fixed number of pulses.

16. The system of claim 15, further comprising a storage element configured to store a pattern of bits, wherein said clock circuit is configured to utilize said first clock signal to select a sequence of values from a storage element.

17. The system of claim 16, wherein said storage element comprises a first and second shift register, and wherein said clock circuit is configured to select said sequence of values from said registers in an alternating manner.

18. The system of claim 17, wherein said clock circuit is further configured to load said shift registers with predetermined values.

19. The system of claim 18, wherein said clock circuit is further configured to change a contents of said shift registers at selected times in order to generate said second clock signal with an increasing frequency.

20. The system of claim 18, wherein said clock circuit is further configured to change a contents of said shift registers at selected times in order to generate said second clock signal with a decreasing frequency.

21. The system of claim 15, further comprising a system controller coupled to said processor, wherein said system controller is coupled to receive said reference clock signal.

22. The system of claim 21, wherein said system controller is further coupled to a main memory, graphics adapter, and peripheral bus controller.

* * * * *